United States Patent
Breau et al.

(10) Patent No.: US 8,537,843 B1
(45) Date of Patent: Sep. 17, 2013

(54) TIMER BASED LOGIC COMPONENT FOR INITIAL FILTER CRITERIA IN A WIRELESS COMMUNICATION SYSTEM

(75) Inventors: Jeremy R. Breau, Leawood, KS (US); Bejoy Pankajakshan, Olathe, KS (US); Charles Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 354 days.

(21) Appl. No.: 12/858,099

(22) Filed: Aug. 17, 2010

(51) Int. Cl.
*H04L 12/28* (2006.01)
*H04L 12/56* (2011.01)

(52) U.S. Cl.
USPC ............................. 370/401; 370/431; 370/464

(58) Field of Classification Search
None
See application file for complete search history.

(56) References Cited

U.S. PATENT DOCUMENTS

| 7,613,705 | B2 | 11/2009 | Ayers et al. | |
| 2006/0114932 | A1* | 6/2006 | Cai et al. | 370/466 |
| 2006/0140385 | A1 | 6/2006 | Haase et al. | |
| 2006/0270404 | A1* | 11/2006 | Tuohino et al. | 455/432.3 |
| 2007/0038723 | A1* | 2/2007 | Gourraud | 709/218 |
| 2007/0047530 | A1 | 3/2007 | Ayers et al. | |
| 2007/0053330 | A1* | 3/2007 | Stafford et al. | 370/338 |
| 2007/0088836 | A1* | 4/2007 | Tai et al. | 709/227 |
| 2007/0263822 | A1* | 11/2007 | Chang et al. | 379/202.01 |
| 2007/0280455 | A1* | 12/2007 | Cai | 379/201.01 |
| 2009/0262920 | A1 | 10/2009 | Henrikson et al. | |

* cited by examiner

*Primary Examiner* — Chi Pham
*Assistant Examiner* — Soon-Dong D Hyun

(57) ABSTRACT

Systems and methods are disclosed herein for providing initial filter criteria with a time limit for providing an application service. In a particular embodiment, a method includes receiving a service request for an application into an IP Multimedia Subsystem (IMS). The method further provides, in the IMS, processing the service request to generate initial filter criteria that includes a first logic component that has a first time limit to control provision of the application to the user and transferring the initial filter criteria from the IMS and receiving the initial filter criteria into an application server. Additionally, the method includes, in the application server, before the first time limit expires, providing the application to the user based on the initial filter criteria with the first logic component, and after the first time limit expires, providing the application to the user based on the initial filter criteria without the first logic component.

20 Claims, 7 Drawing Sheets

TIMER BASED LOGIC COMPONENT FOR INITIAL FILTER CRITERIA IN A WIRELESS COMMUNICATION SYSTEM

TECHNICAL BACKGROUND

Wireless communication devices, such as cellular phones, communicate using wireless communication networks. A wireless communication device may use the wireless communication network to access a service provided by a service system. The manner in which the service is provided and billed to the wireless communication device may be regulated by initial filter criteria. The initial filter criteria may be unique to each wireless device and may be based on the service limitations of an individual customer.

Initial filter criteria may be created in an Internet Protocol Multimedia Subsystem (IMS) upon registration of a wireless device. The initial filter criteria may be sent to a service system so that the service system may provide a service to the wireless device in accordance with the initial filter criteria. After creation, the initial filter criteria may not be changed Likewise, once sent to the service system, the initial filter criteria sent to the service system may not be capable of being changed. Thus, services accessed by the wireless device on the service system are always regulated in the same manner while the wireless device is registered with the IMS.

OVERVIEW

Systems and methods are disclosed herein for providing initial filter criteria with a time limit for providing an application service. In a particular embodiment, a method includes receiving a service request for an application into an IP Multimedia Subsystem (IMS). The method further provides, in the IMS, processing the service request to generate initial filter criteria that includes a first logic component that has a first time limit to control provision of the application to the user and transferring the initial filter criteria from the IMS and receiving the initial filter criteria into an application server. Additionally, the method includes, in the application server, before the first time limit expires, providing the application to the user based on the initial filter criteria with the first logic component, and after the first time limit expires, providing the application to the user based on the initial filter criteria without the first logic component.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
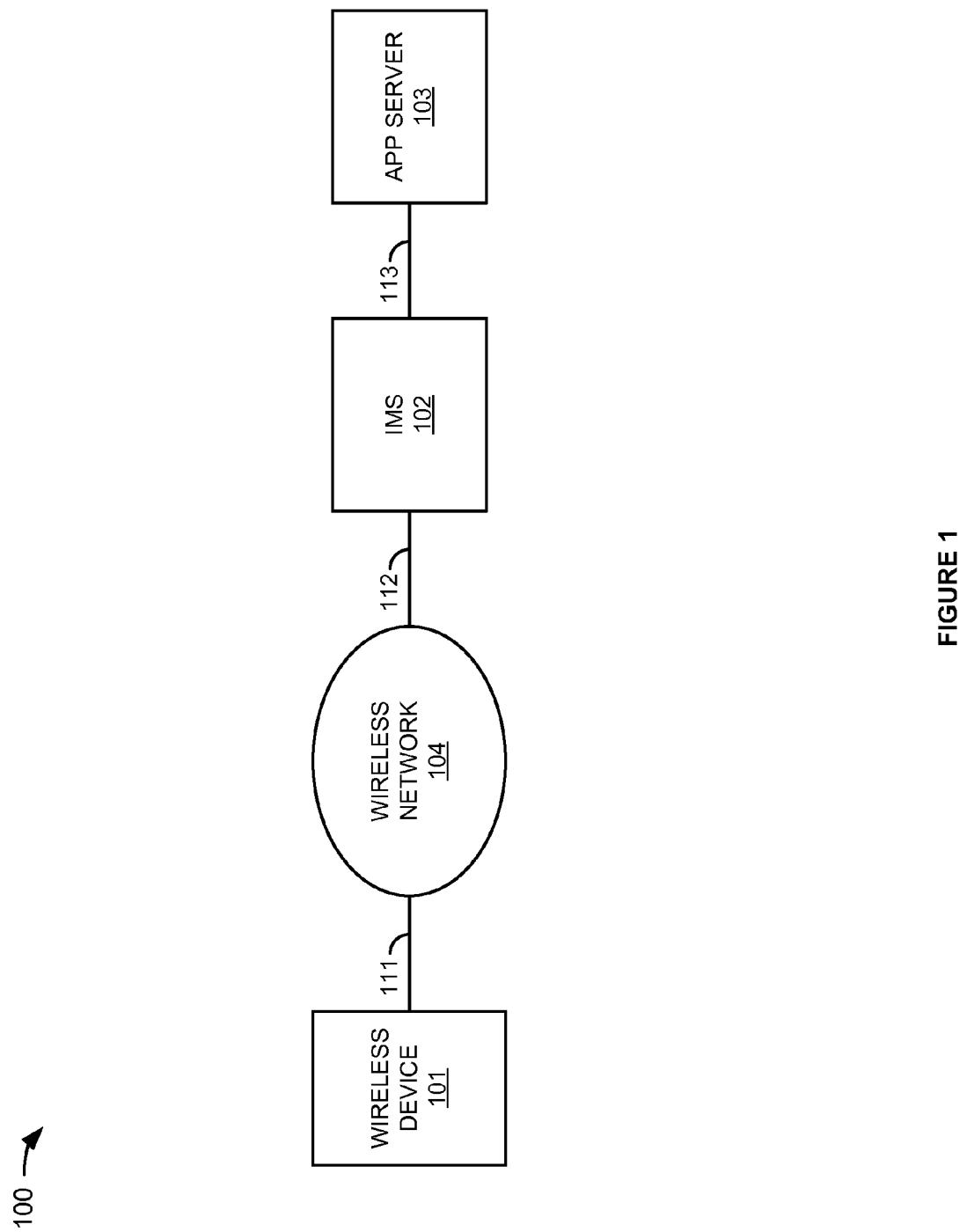
FIG. 1 illustrates a wireless communication system.

FIG. 1 illustrates wireless communication system 100. Wireless communication system 100 includes wireless communication device 101, IP Multimedia Subsystem (IMS) 102, application server 103, and wireless communication network 104. Wireless device 101 and wireless communication network 104 communicate over wireless link 111. IMS 102 and wireless communication network 104 communicate over communication link 112. Application server 103 and IMS 102 communicate over communication link 113.

In operation, wireless device 101 is provided with service for an application by connecting to application server 103 through wireless network 104. Upon registration with wireless network 104, IMS 102 may create initial filter criteria for providing application services to wireless device 101. Alternatively, the initial filter criteria may be created after an application service request is received for an application service. The initial filter criteria provides various guidelines for providing an application service. For example, the initial filter criteria may include information on whether the application service is available to wireless device 101, how the application service is billed to wireless device 101, what level of service can be provided to wireless device 101, and any other information that application server 103 may use to provide an application service to wireless device 101. The initial filter criteria is transferred to application server 103 so that application server 103 can use the initial filter criteria when providing an application service to wireless device 101. The initial filter criteria is valid as long as wireless device 101 is registered with wireless network 104.

Figure 2:
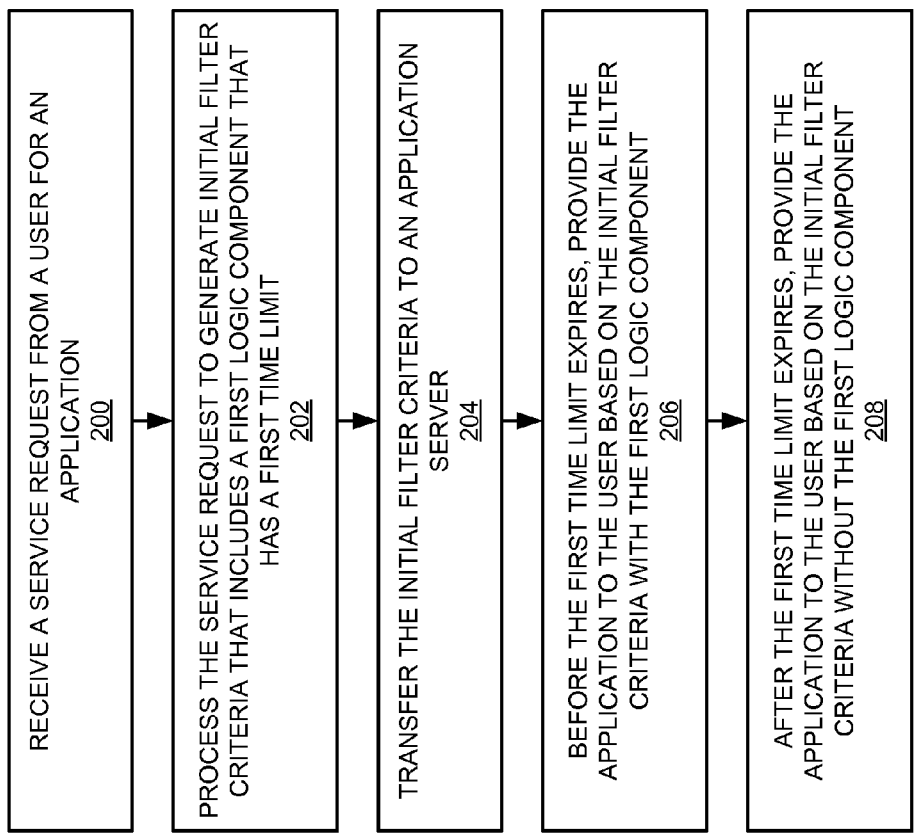
FIG. 2 illustrates the operation of a wireless communication system.

FIG. 2 illustrates the operation of wireless communication system 100. Wireless device 101 transfers a service request for an application. IMS 102 receives the service request for the application (step 200). The requested application may be any type of application for a wireless device, such as audio, video, email, or web browsing. The application service request may be received by the IMS in session initiation protocol (SIP). The service request may be transferred from wireless device 101 based on a user input. Alternatively, the service request may be transferred automatically, as may be the case if wireless device 101 is configured to periodically check for email.

IMS 102 processes the service request to generate initial filter criteria that includes a first logic component that has a first time limit to control provision of the application to the user (step 202). The initial filter criteria places limitations on the provision of the requested application, such as service level and billing rate for the application. The first time limit may be a duration of time or a time period. The first logic component may include different features or limitations on the provision of the application than those that are provided by the initial filter criteria alone.

The limitations provided by the first logic component may be more or less constraining than the limitations provided by the initial filter criteria. For example, the initial filter criteria may allow the full extent of an application to be provided to wireless device 101, but the first logic component may only allow for a subset of the application to be provided to wireless device 101. Conversely, the initial filter criteria may only allow a subset of an application while the first logic component may allow for the full application to be provided. In another example, the initial filter criteria may provide that the application should be provided at a first billing rate while the first logic component may provide that the application should be provided at a second billing rate.

After creating the initial filter criteria including the first logic component, IMS 102 transfers the initial filter criteria to application server 103 (step 204). The initial filter criteria may be transferred to application server 103 within a SIP message. Before the first time limit expires, application server 103 provides the application to the user based on the initial filter criteria with the first logic component (step 206). After the first time limit expires, application server 103 provides the application to the user based on the initial filter criteria without the first logic component. Therefore, whatever the first logic component instructs application server 103 to provide regarding the requested application, application server only follows the first logic component until the first time limit expires. After the expiration of the time limit, application server 103 provides the application in accordance with the initial filter criteria without the influence of the first logic component.

In some embodiments, IMS 102 processes the service request to generate a second logic component that has a second time limit to control provision of the application to the user. The second logic component is further included in the initial filter criteria that is transferred to application server 103. Before the second time limit expires, application server 103 provides the application to the user based on the initial filter criteria without the second logic component. Then, after the second time limit expires, application server 103 provides the application to the user based on the initial filter criteria with the second logic component.

In some embodiments, the first logic component may include a geographic restriction component instead of or in addition to the first time limit. The geographic restriction may provide that wireless device 101 must stay within a geographic area or areas in order for the provisions of the first logic component to apply. Alternatively, the geographic restriction may provide that wireless device 101 must stay out of a geographic area or areas.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

IMS 102 comprises a computer system and communication interface. IMS 102 may also include other components such a router, server, data storage system, and power supply. IMS 102 may reside in a single device or may be distributed across multiple devices.

Application server 103 comprises a computer system and communication interface for supplying an application service. Application server 103 may also include other components such a router, server, data storage system, and power supply. Application server 103 may reside in a single device or may be distributed across multiple devices. Application server 103 is shown connected to IMS 102, but server 103 could be connected to IMS 102 through wireless network 104.

Wireless communication network 104 is a communication network that comprises telephony switches, wireless access nodes, Internet routers, network gateways, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-113 use metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-113 could be direct links or may include intermediate networks, systems, or devices.

Figure 3:
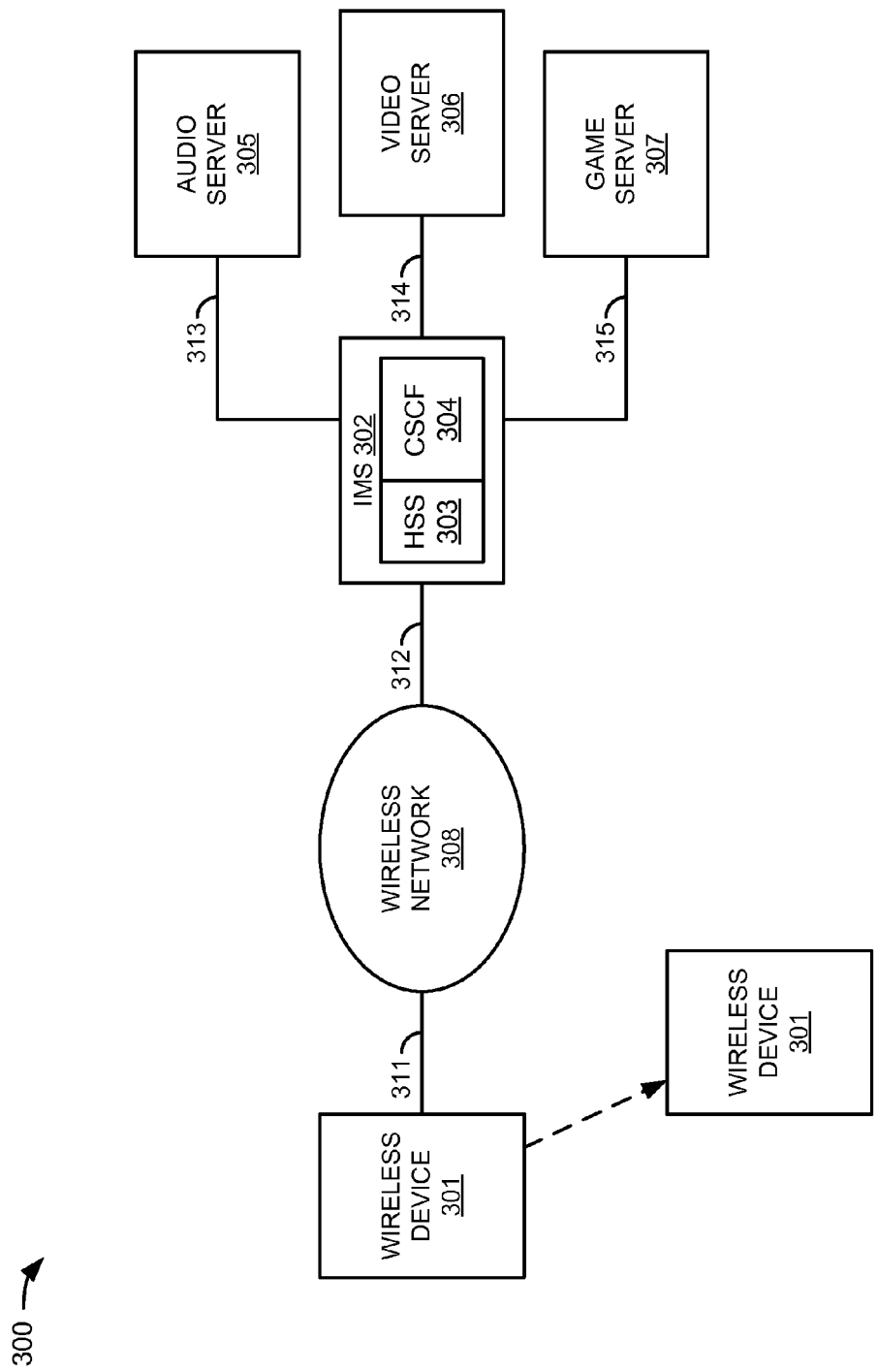
FIG. 3 illustrates a wireless communication system.

FIG. 3 illustrates wireless communication system 300. Wireless communication system 300 includes wireless communication device 301, IMS 302, audio server 305, video server 306, game server 307, and wireless communication network 308. IMS 302 includes home subscriber server (HSS) 303 and call session control function (CSCF) 304. Wireless communication device 301 and wireless communication network 308 communicate over wireless link 311. IMS 302 and wireless communication network 308 communicate over communication link 312. Audio server 305 and IMS 302 communicate over communication link 313. Video server 306 and IMS 302 communicate over communication link 314. Game server 307 and IMS 302 communicate over communication link 315.

In operation, when wireless device 301 first connects to wireless network 308, wireless device 301 must register in order to exchange communications with wireless network 308. Initial filter criteria for wireless device 301 may be stored in HSS 303 then transferred to CSCF 304 upon the registration of wireless device 301. CSCF 304 is then able to transfer the initial filter criteria to application servers 305-307 upon receiving an application request from wireless device 301.

Figure 4:
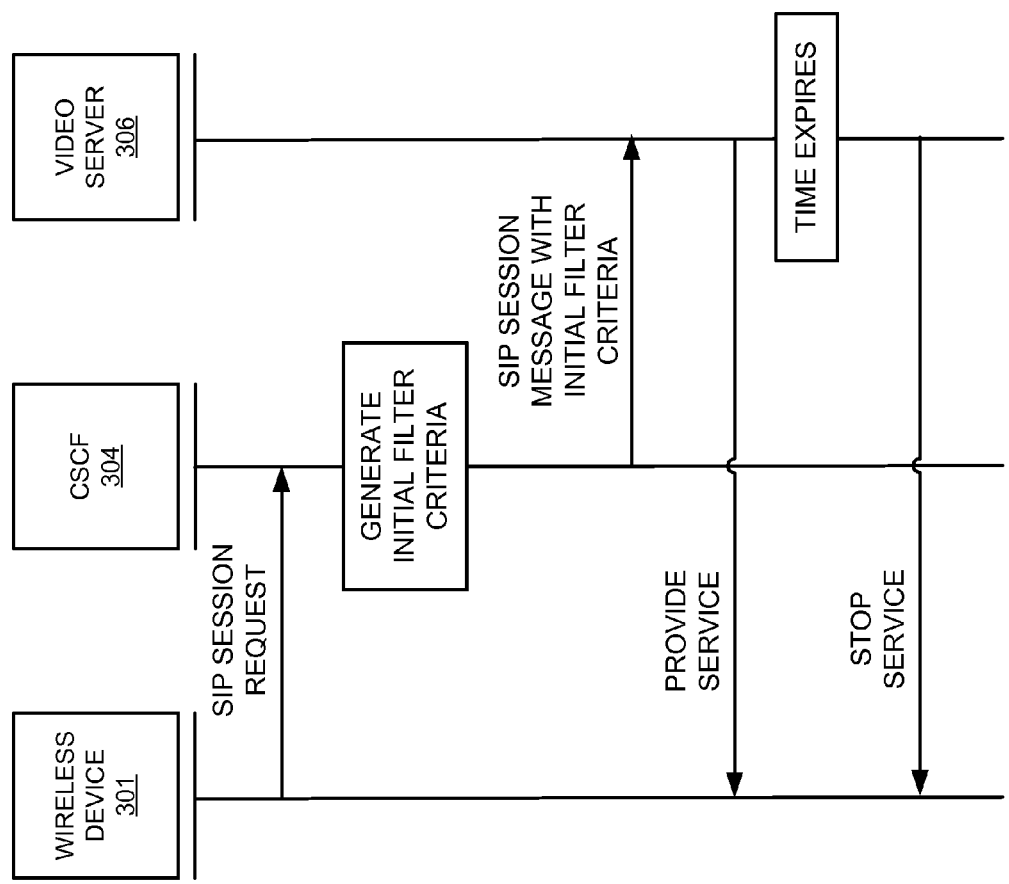
FIG. 4 illustrates the operation of a wireless communication system.

FIG. 4 is a sequence diagram illustrating the operation of wireless communication system 300. Wireless device 301 transfers a SIP session request to CSCF 304 for a video application service. The session request may be transferred from wireless device 301 in response to receiving a user input or may be performed in response to an automated process on wireless device 301.

CSCF 304 then processes the session request to generate initial filter criteria that includes a first logic component that has a first time limit to control provision of the application to wireless device 301. CSCF 304 may process customer information or preferences for wireless device 301 or network requirements when determining the first logic component or time limit. The initial filter criteria without the first logic component may be the initial filter criteria that CSCF 304 receives from HSS 303 upon registration of wireless device 301. In that case, the first logic component is appended to the initial filter criteria. Alternatively, CSCF 304 may generate the initial filter criteria and first logic component itself.

In this example, the account to which wireless device 301 belongs has been configured to only allow one hour of video watching per day. When CSCF 304 processes the video service request from wireless device 301, CSCF 304 includes a first logic component that allows video service for a limit of one hour. Therefore, the initial filter criteria without the first logic component does not allow wireless device 301 to access video service provided by video server 304. However, when the first logic component is included with the initial filter criteria, then the video service is allowed for a time of one hour. The logic component and time limit may be different for services provided by audio server 305 and game server 307.

After generating the initial filter criteria with the first logic component, CSCF 304 transfers the initial filter criteria with the first logic component in a SIP message to video server 306. The SIP message indicates the video service that wireless device 301 requested. Video server 301 then provides the video application service to wireless device 301 based on the first logic component included within the initial filter criteria. However, the first logic component has the one hour time limit and, thus, expires after one hour of service. After the first logic component expires, video server 306 must provide the service based on the initial filter criteria without the first logic component. Since the initial filter criteria in this example does not allow wireless device 301 to receive video service, video server 306 stops providing the service to wireless device 301.

Figure 5:
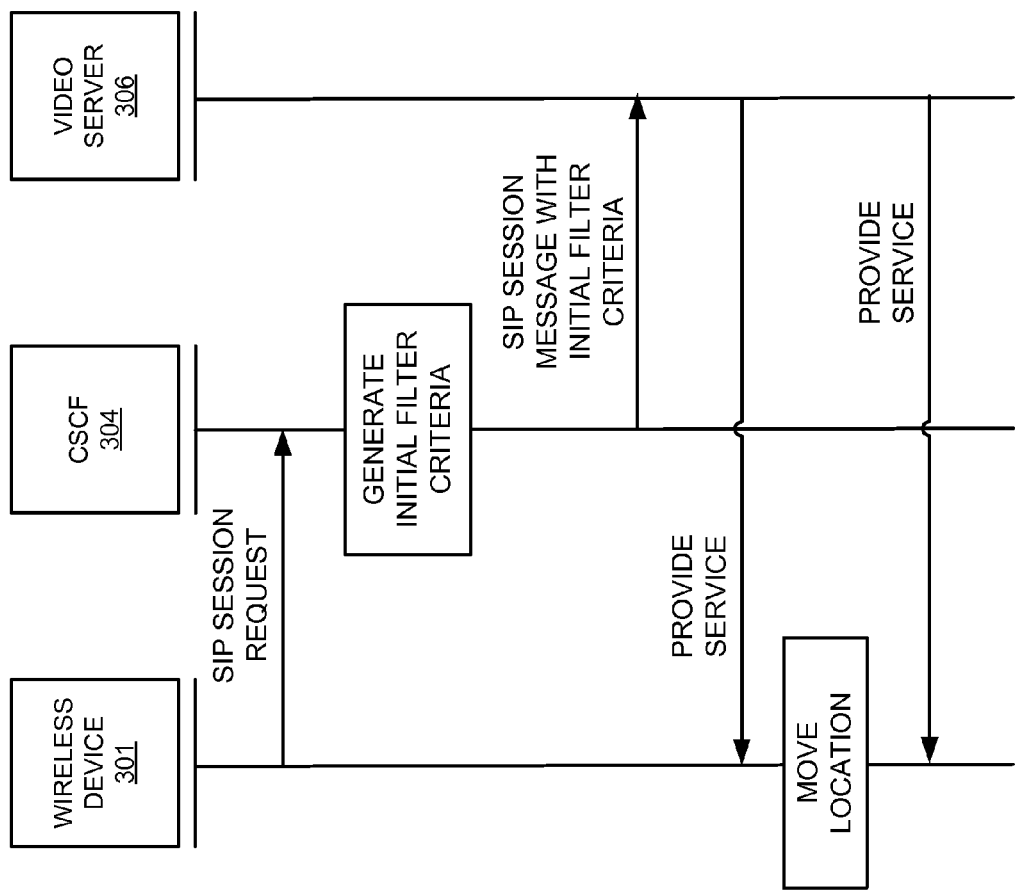
FIG. 5 illustrates the operation of a wireless communication system.

FIG. 5 is a sequence diagram illustrating the operation of wireless communication system 300. Wireless device 301 transfers a SIP session request to CSCF 304 for a video application service. The session request may be transferred from wireless device 301 in response to receiving a user input or may be performed in response to an automated process on wireless device 301.

CSCF 304 then processes the session request to generate initial filter criteria that includes a first logic component. Additionally, in this example, the first logic component has a geographic limitation and a billing limitation along with a first time limit to control provision of the application to wireless device 301. CSCF 304 may process wireless device information for wireless device 301, customer information or preferences for wireless device 301, or other network requirements when determining the first logic component, the geographic limitation, billing limitation, or time limit. The initial filter criteria without the first logic component may be the initial filter criteria that CSCF 304 receives from HSS 303 upon registration of wireless device 301. In that case, the first logic component is appended to the initial filter criteria. Alternatively, CSCF 304 may generate the initial filter criteria and first logic component itself.

In this example, the initial filter criteria without the first logic component allows the video service to be provided to wireless device 301 at an off peak billing rate. However, when CSCF 304 processes the video service request from wireless device 301, CSCF 304 includes a first logic component that requires that the video service be provided at a peak billing rate while either in a specified geographic location or until 5 p.m. Therefore, the initial filter criteria with and without the first logic component both allow video service to be provided to wireless device 301, but the first logic component provides a different billing rate. The logic component, geographic limitation, billing limitation, or time limit may be different for services provided by audio server 305 and game server 307.

After generating the initial filter criteria with the first logic component, CSCF 304 transfers the initial filter criteria with the first logic component in a SIP message to video server 306. The SIP message indicates the video service that wireless device 301 requested. Video server 301 then provides the video application service to wireless device 301 based on the first logic component included within the initial filter criteria. In this example, the first logic component indicates that the video service should be provided at a peak billing rate while wireless device 301 is in a certain geographic area before 5 p.m. When wireless device 304 moves from the geographic area as indicated by the dashed arrow in FIG. 3, then video server 306 must provide the service based on the initial filter criteria without the first logic component. Therefore, after wireless device 304 moves, video server 306 provides the video service at an off peak billing rate. Video server 304 may determine the location of wireless device 301 by receiving updates on the location of wireless device 301 from wireless device 301, wireless network 308, or some other method for determining the location of a wireless device.

Figure 6:
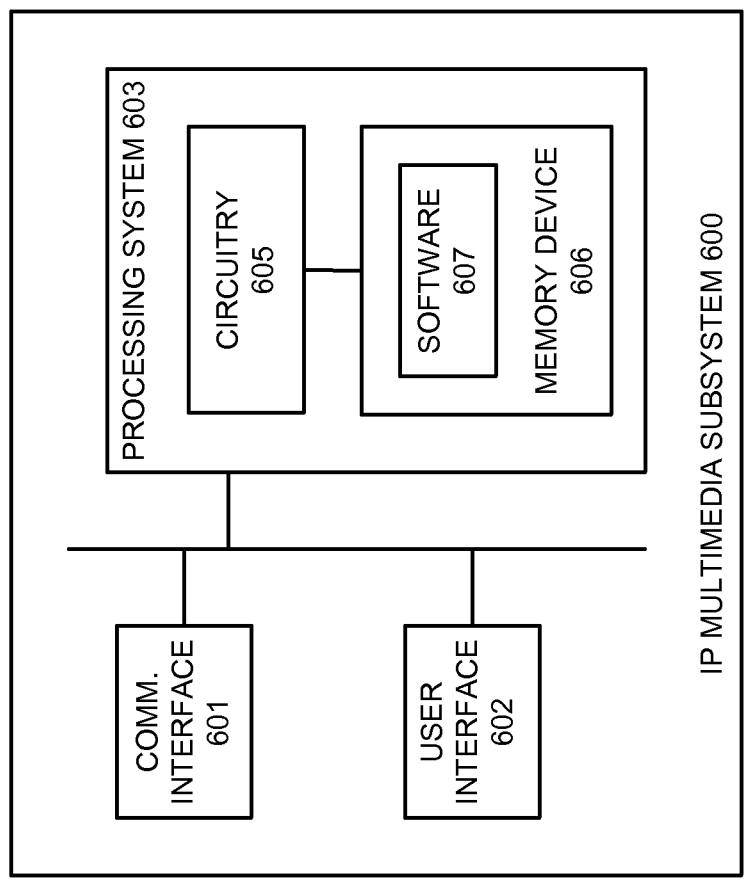
FIG. 6 illustrates an IP Multimedia Subsystem.

FIG. 6 illustrates IP Multimedia Subsystem 600. IMS 600 is an example of communication control system 102, although IMS 102 may use alternative configurations. IMS 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate IMS 600 as described herein.

In particular, operating software 607 directs processing system 603 to receive the service request for an application via communication interface 601. Processing system 603 is further directed to process the service request to generate initial filter criteria that includes a first logic component that has a first time limit to control provision of the application to the user. Processing system is then directed to transfer the initial filter criteria to an application server.

Figure 7:
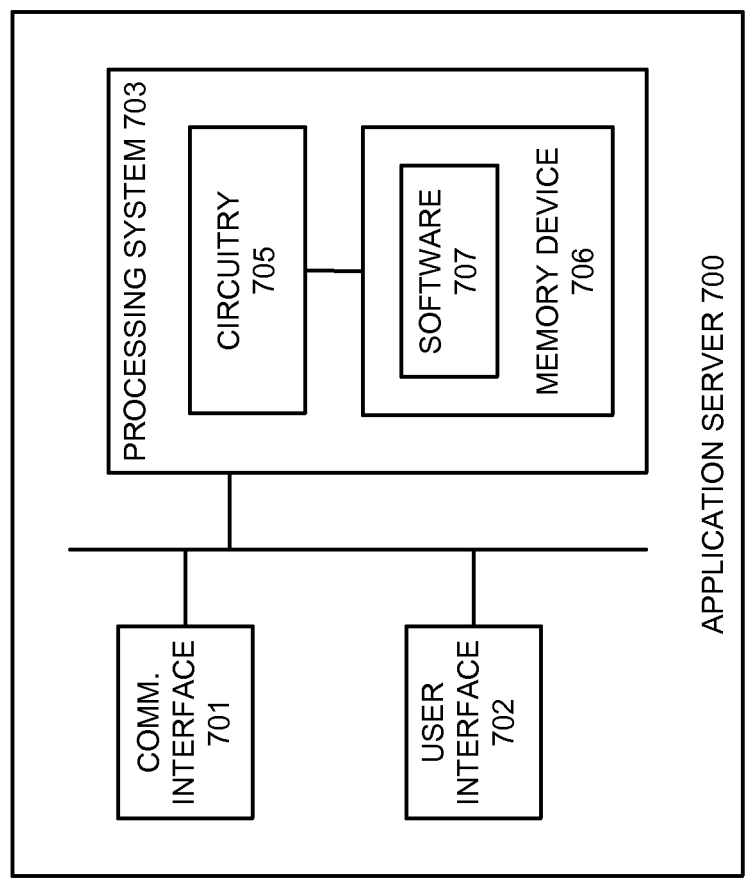
FIG. 7 illustrates an application server.

FIG. 7 illustrates communication control system 700. Communication control system 700 is an example of communication control system 103, although control system 103 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate communication control system 700 as described herein.

In particular, operating software 707 directs processing system 703 to receive initial filter criteria via communication interface 701. Processing system 703 is further directed to, before a first time limit expires, provide the application to the user based on the initial filter criteria with a first logic component. After the first time limit expires, processing system 703 is directed to provide the application to the user based on the initial filter criteria without the first logic component.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Internet Protocol (IP) communication system wherein a user transfers a service request for an application, the method comprising:
   receiving the service request for the application into an IP Multimedia Subsystem (IMS);
   in the IMS, processing the service request to generate initial filter criteria that includes a first logic component that has a first time limit to control provision of the application to the user;
   transferring the initial filter criteria from the IMS and receiving the initial filter criteria into an application server;
   in the application server before the first time limit expires, providing the application to the user based on the initial filter criteria with the first logic component, and after the first time limit expires, providing the application to the user based on the initial filter criteria without the first logic component.

2. The method of claim 1 wherein receiving the service request into the IMS comprises receiving a user registration request.

3. The method of claim 1 wherein receiving the service request into the IMS comprises receiving a Session Initiation Protocol (SIP) message.

4. The method of claim 1 wherein transferring the initial filter criteria from the IMS comprises transferring a Session Initiation Protocol (SIP) message and receiving the initial filter criteria into the application server comprises receiving the SIP message.

5. The method of claim 1 wherein first logic component is configured to provide a special feature that the application does not provide without the first logic component.

6. The method of claim 1 wherein first logic component indicates a geographic restriction for the application.

7. The method of claim 1 wherein first logic component indicates a billing instruction for the application.

8. The method of claim 1 wherein:
   in the IMS, processing the service request to generate the initial filter criteria further comprises processing the service request to generate the initial filter criteria that includes a second logic component that has a second time limit to control provision of the application to the user;
   in the application server before the second time limit expires, providing the application to the user based on the initial filter criteria without the second logic component, and after the second time limit expires, providing the application to the user based on the initial filter criteria with the second logic component.

9. The method of claim 8 wherein second logic component indicates a geographic restriction for the application.

10. The method of claim 9 wherein second logic component indicates a billing instruction for the application.

11. An Internet Protocol (IP) communication system wherein a user transfers a service request for an application, the system comprising:
    an IP Multimedia Subsystem (IMS) configured to receive the service request for the application, process the service request to generate initial filter criteria that includes a first logic component that has a first time limit to control provision of the application to the user, and transfer the initial filter criteria to an application server;
    the application server configured to receive the initial filter criteria and, before the first time limit expires, provide the application to the user based on the initial filter criteria with the first logic component, and after the first time limit expires, provide the application to the user based on the initial filter criteria without the first logic component.

12. The system of claim 11 wherein the IMS is configured to receive the service request by receiving a user registration request.

13. The system of claim 11 wherein the IMS is configured to receive the service request by receiving a Session Initiation Protocol (SIP) message.

14. The system of claim 11 wherein the IMS is configured to transfer the initial filter criteria by transferring a Session Initiation Protocol (SIP) message and the application server is configured to receive the initial filter criteria by receiving the SIP message.

15. The system of claim 11 wherein first logic component is configured to provide a special feature that the application does not provide without the first logic component.

16. The system of claim 11 wherein first logic component indicates a geographic restriction for the application.

17. The system of claim 11 wherein first logic component indicates a billing instruction for the application.

18. The system of claim 11 wherein:
   the IMS further configured to process the service request to generate the initial filter criteria further by processing the service request to generate the initial filter criteria that includes a second logic component that has a second time limit to control provision of the application to the user;
   the application server further configured to, before the second time limit expires, provide the application to the user based on the initial filter criteria without the second logic component, and after the second time limit expires, provide the application to the user based on the initial filter criteria with the second logic component.

19. The system of claim 18 wherein second logic component indicates a geographic restriction for the application.

20. The method of claim 19 wherein second logic component indicates a billing instruction for the application.

* * * * *